United States Patent [19]

Dolby

[11] 4,184,183
[45] Jan. 15, 1980

[54] FIELD REPLACEABLE HEADS FOR MAGNETIC TAPE MACHINE

[75] Inventor: Dale P. Dolby, Los Altos, Calif.

[73] Assignee: Ampex Corporation, Redwood City, Calif.

[21] Appl. No.: 894,309

[22] Filed: Apr. 7, 1978

[51] Int. Cl.² .................. G11B 5/56; G11B 21/24
[52] U.S. Cl. .................................. 360/107; 360/109
[58] Field of Search .......... 360/107, 109, 84, 128–129, 360/104

[56] References Cited

U.S. PATENT DOCUMENTS

| | | | |
|---|---|---|---|
| 3,207,517 | 9/1965 | Tanigawa et al. | 360/84 |
| 3,319,015 | 5/1967 | Eccarius et al. | 360/107 |
| 3,401,236 | 9/1968 | Narma et al. | 360/107 |
| 3,679,838 | 7/1972 | Salcedo et al. | 360/109 |
| 4,058,845 | 11/1977 | Zahn | 360/107 |
| 4,081,848 | 3/1978 | Blanding | 360/109 |
| 4,117,522 | 9/1978 | Whittle et al. | 360/109 |

*Primary Examiner*—Alfred H. Eddleman
*Attorney, Agent, or Firm*—Robert G. Clay; Charles M. Carman, Jr.

[57] ABSTRACT

A rotating transducing head drum that mounts a number of transducer heads for sweeping rotation across the surface of a record medium. The head mounts are either of the bimorph, i.e., laterally displaceable leaf type, or of a non-displaceable leaf type simulating the displaceable type; in either case the mounts are factory secured in substantially identical shoes and in precise predetermined dimensional relation to radially, axially and circumferentially facing gauge surfaces of the shoes. Mating gauge surfaces are factory formed on the drum. Thus, the heads with their shoes are interchangeable in the field without the need for field adjustments.

10 Claims, 9 Drawing Figures

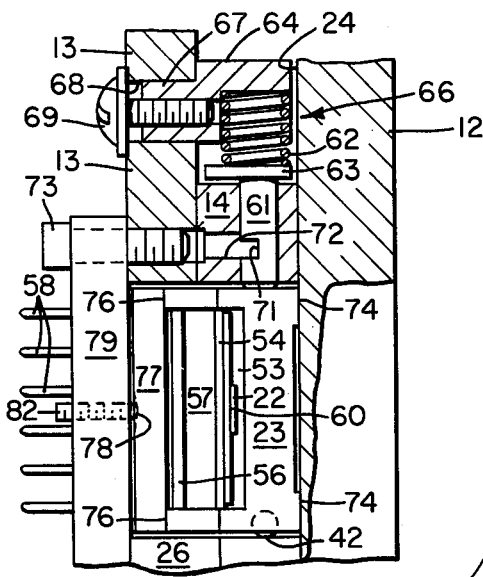
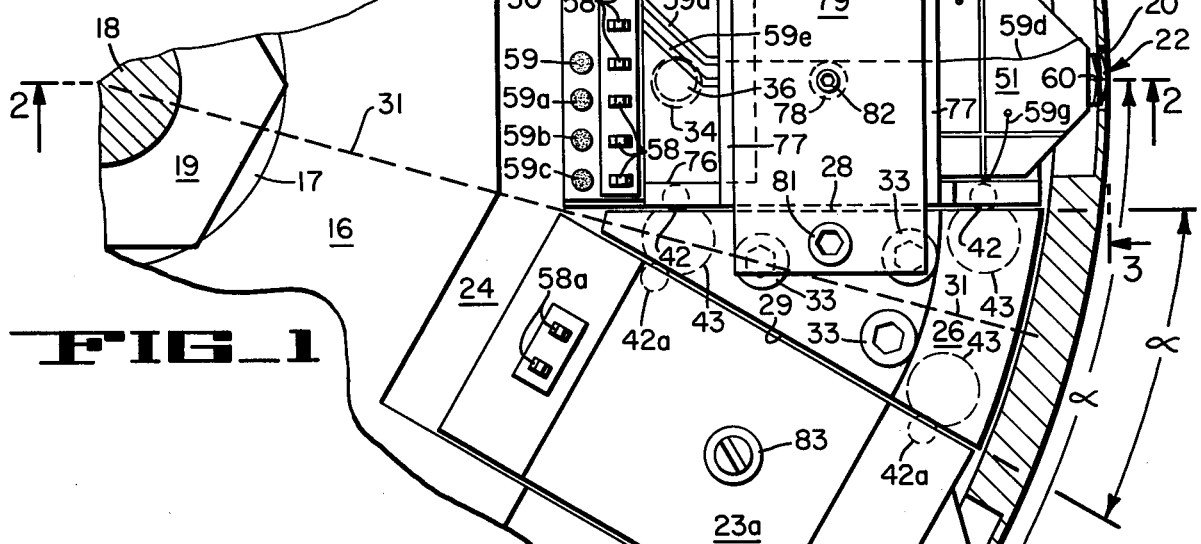
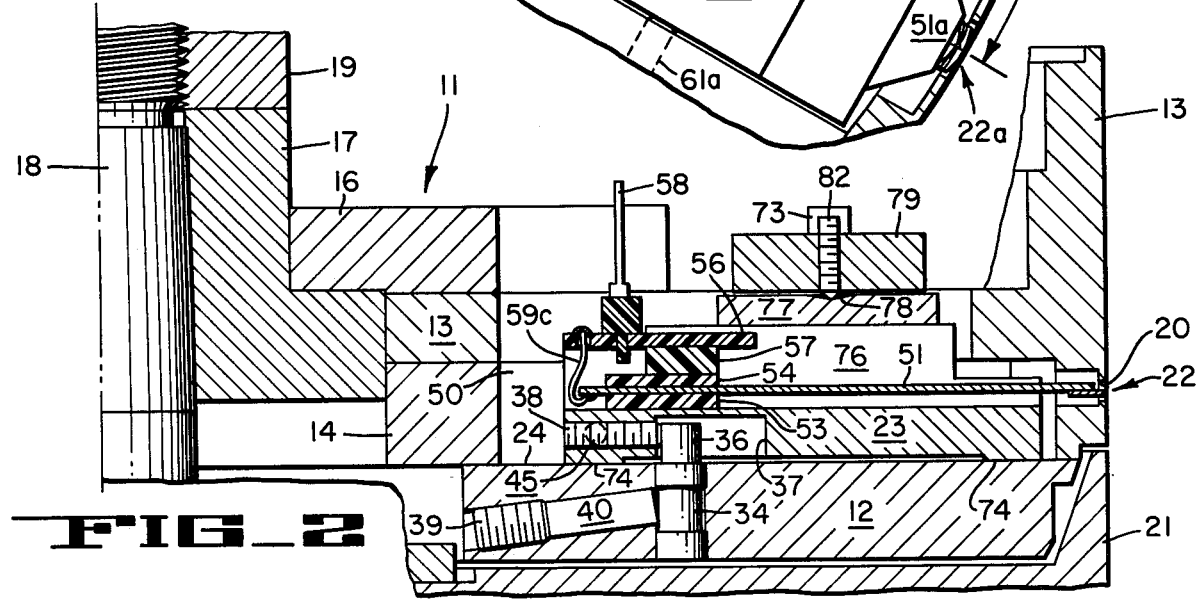

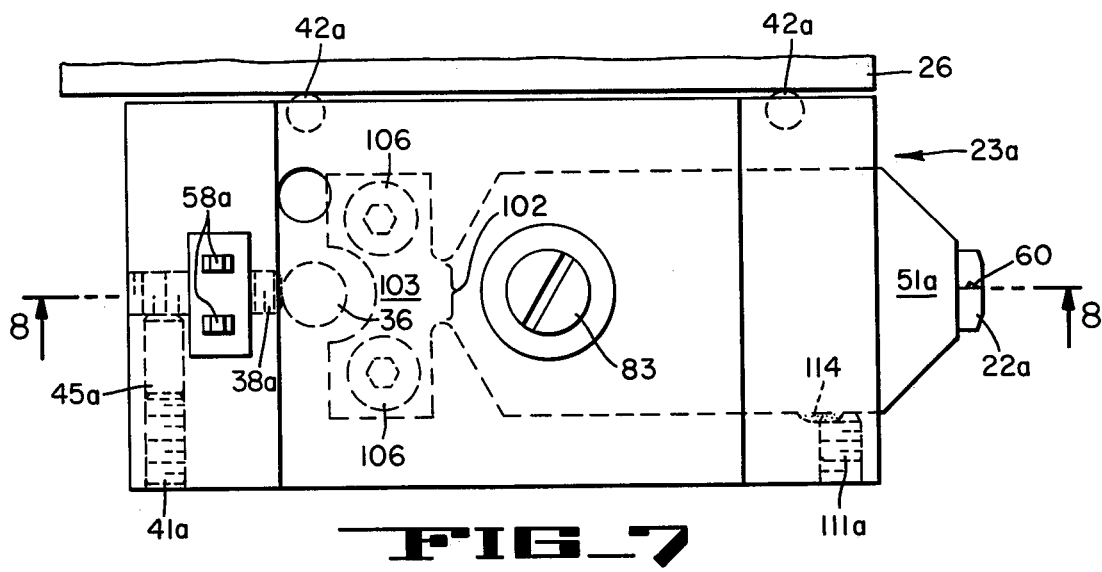
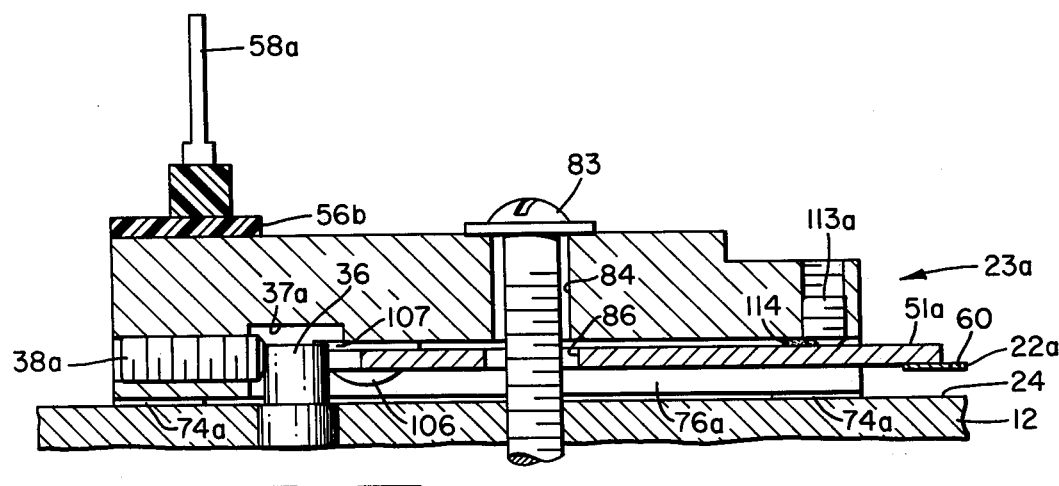
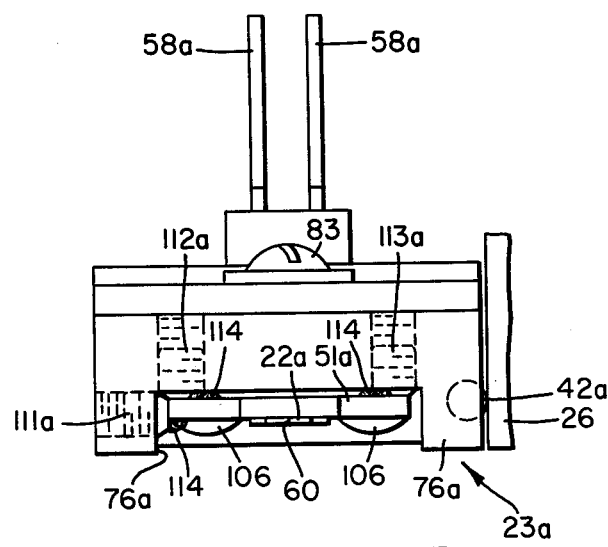

FIELD REPLACEABLE HEADS FOR MAGNETIC TAPE MACHINE

BACKGROUND OF THE INVENTION

This invention relates to magnetic transducing head assemblies, and particularly to such assemblies requiring that one or more heads to precisely mounted to fine tolerances in two or three orthogonal directions.

In the magnetic tape recording and reproducing art, it is frequently desired to mount the magnetic transducing heads (i.e., record heads, read or playback heads, and erase heads) on a rotating drum for successive sweeping motion across the tape, either nearly transversely, or obliquely as in helical-scan machines. It has always been a problem in such machines to achieve precisely uniform circumferential spacing between the heads, as well as precise radial and axial positioning. An elaboration of this problem is that of achieving such precision in what is termed "field-replaceable" heads, so that the entire drum assembly does not have to be returned to the factory for the replacement of a single head. Ideally, it ought to be possible to send a new head from the factory, or to maintain a reserve stock of such heads in the field, for instant interchange with defective heads on the drum, the defective heads being then returned to the factory for repair. An example of one solution to this problem is disclosed in co-pending U.S. patent application Ser. No. 729,283, now U.S. Pat. No. 4,099,212, entitled "Rotating Transducing Head Assembly," filed Oct. 4, 1976 by the present inventor.

The field-replacement problem is further complicated when it arises in connection with so-called "bi-morph" or "automatic scan-tracking" heads, such as those disclosed in co-pending U.S. patent applications Ser. No. 668,651, now U.S. Pat. No. 4,151,569, entitled "Positionable Transducer Mounting Structure," filed Mar. 19, 1976, by Richard Allen Hathaway, Ser. No. 677,683, now U.S. Pat. No. 4,093,885, "Transducer Assembly Vibration Sensor," filed Apr. 19, 1976 by David E. Brown (continuation-in-part of Ser. No. 668,653 filed Mar. 19, 1976), and Ser. No. 722,822, now U.S. Pat. No. 4,099,211, "Positionable Transducing Mounting Structure and Driving System Therefor," Richard A. Hathaway, filed Sept. 13, 1976. In such head assemblies, the head is mounted at the extremity of a thin leaf member, which is displaceable laterally of the tracking direction as the drum rotates across the tape, so as to be able to follow, on playback, a track that, for any of several possible reasons, does not conform to a normal shape.

In the present invention, it is desired to use such an automatic scan tracking head as merely one of six heads on the same drum, the other five being of fixed-head types, i.e., fixed with respect to the drum. The problem then becomes one of making all six heads, though of different types, field-replaceable in a simple and uniform way.

Accordingly, it is an object of the present invention to provide a precision-mounted field replaceable head assembly for rotating transducing head drums, suitable for use with a variety of different head types.

DESCRIPTION OF THE DRAWINGS

FIG. 1 is a fragmentary plan view of a portion of a rotating head drum with two heads mounted thereon;

FIG. 2 is a cross-sectional elevation view of the assembly of FIG. 1, taken on the plane 2—2 of FIG. 1;

FIG. 3 is a cross-sectional and elevation view of the assembly of FIG. 1, taken on the planes 3—3 of FIG. 1;

FIG. 7 is a plan view, to an enlarged scale, of one of the head mountings shown in FIG. 1;

FIG. 8 is a cross-sectional elevation view of the assembly of FIG. 7, taken on the plane 8—8 of FIG. 7; and FIG. 9 is a right-end view of the assembly of FIG. 7.

DESCRIPTION OF THE PREFERRED EMBODIMENTS

Figure 4:
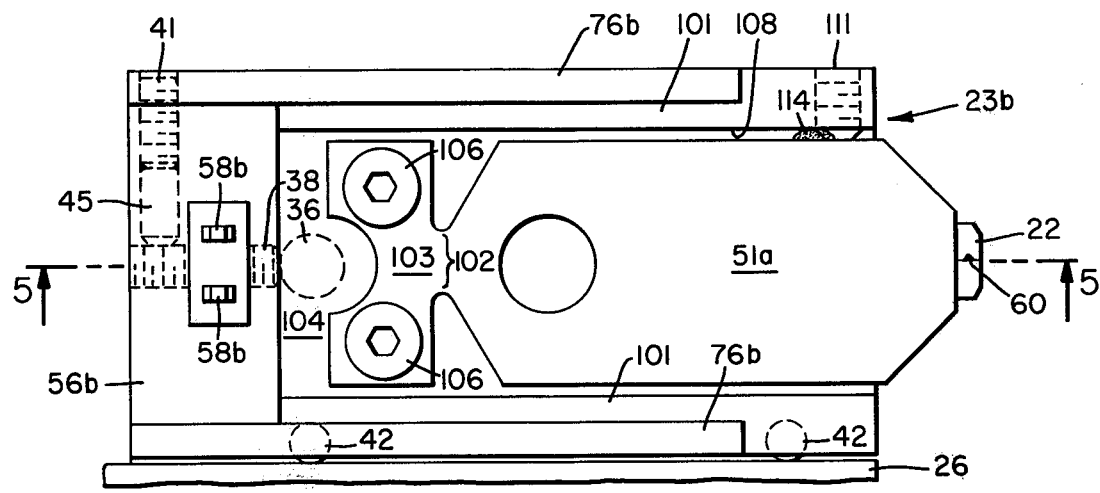
FIG. 4 is a plan view, to an enlarged scale, of a head mounting suitable for use in the drum of FIG. 1.

Referring now to FIGS. 1 and 2, there is shown a rotating head drum 11 comprising a lower circular base plate 12 and a cylindrical upper drum member 13, which is bolted or otherwise firmly attached to the base plate 12. A spacing spider 14 is disposed between the elements 12, 13 and in here shown as epoxy-glued to the drum 13, but may be cast integral therewith. An upper spider 16, also epoxy-glued to the drum 13, serves to mount the drum on a flanged sleeve 17, which is fitted on a tapered drive shaft 18 and retained thereon by a nut 19. The drive shaft is mounted on precision bearings (not shown) which in turn are mounted on the interior structure of a lower fixed tape guide drum 21. On this basic structure it is desired to mount a pair of magnetic transducing heads 22 and 22a, mounted in windows 20 of the drum 13, and as will later be described in greater detail, in a pair of modular mounting shoes 23 and 23a, respectively (see also FIGS. 4–9).

As first steps toward providing a field-replaceable precision mounting characteristic for the heads 22, 22a, there are provided on the drum a set of gauge surfaces, including the upper surface 24 of the base plate 12, which is needed for accuracy of location of the heads in an axial direction of the drum. For accuracy of location in a circumferential direction, there is provided a wedge element 26, which has a precision-lapped under-surface engaging the reference surface 24, and a pair of gauge reference surfaces 28 and 29, each precisely normal to the under-surface and inclined to one another at precisely the angle α (alpha) that has been chosen for the angular spacing between the two heads 22, 22a. In order to make the surfaces 28, 29 properly available for locating the two heads 22, 23, the wedge element 26 is carefully positioned on the reference surface 24 so that the plane 31 bisecting the angle α between surfaces 28, 29 passes precisely through the geometric axis of the cylinder defined by the outer surface 32 of the drum 13. A variety of ways to accomplish this step will suggest themselves to those who are skilled in the art. One method actually used in the construction of the present invention comprised: (1) mounting three precision comparator gauges of the dial-indicator type (e.g., Mahr "Millimess") on a precision plate (not shown) in angularly equispaced relation, and with the feeler contact points pointing radially inwardly, and centering between them a dummy or gauge reference drum on which are mounted dummy heads on dummy shoes similar to shoes 23, 23a, in the correct position; then (2) establishing on the precision plate, for each head, a position sensing comparator gauge with swiveling contact points (e.g., of the Swiss brand "Alina" with "Compac" sensing elements) oriented for swiveling in a circumferential direction and bearing against the counter-clockwise side of the head; then (3) removing the dummy drum and the dummy shoes therefrom; (4) centering the actual drum 11 on the precision plate and positioning the dummy shoes thereon, in the correct positions as established by the angular sensors; and finally (5) positioning the actual wedge element 26 on the drum in its correct position between and engaging both of the dummy shoes, and securing the wedge element to the drum by means of clamping bolts 33, which are threaded into the drum but pass through the wedge element in bores of substantially greater diameter so as to allow for the above-described positional adjustment prior to clamping.

It should be remarked here that the positioning of the dummy shoes mentioned in step (4) above requires also an alignment of the dummy shoes with their central planes directed radially toward the geometric center of surface 32, and also a radial positioning of the dummy shoes with respect to surface 32, but these steps are best described in relation to further structure set forth below.

For radial positioning of the shoe 23, for example, base plate 12 has an eccentric pin 34 rotationally mounted therein with the eccentric portion 36 of the pin projecting upwardly into a recess 37 in the shoe (FIG. 2). Engaging the eccentric portion 36, on its most radially-inward side, is the tip of a precision set-screw 38. The positions of both pin 36 and screw 38 are established at the factory and, once these positions are established, the screws are locked in place by means of locking set screw 39 (which operates through a brass slug 40) and screw 41, respectively, thus permanently and precisely establishing the radial position of the head 22 even when it is a replacement inserted in the field. The reason for having a degree of adjustability for the screw 38 is simply to provide for the possibility of future dimensional changes. For example, if in the future it were ever decided that better results could be obtained, in some special use perhaps, with a different radial position for all the heads, then the head shoe assemblies above could be returned to the factory for re-setting, and during this process the machine itself could continue to operate with the reserve stock of heads, or with heads previously sent from the factory with the new setting already made.

The initial setting of the eccentric pin 34 may be established, for example, as follows. The controlling dimension "d" is the radial dimension between the radially most inward side of eccentric pin portion 36 and the surface 32 of drum wall 13 at the window 20 where the head is to be positioned. The drum is placed in a jig with surface 32 tangent to a jig gauge surface at the window 20, which jig gauge surface is pierced to permit protrusion of the feeler of a comparator gauge (e.g. Mahr), which is set to register "zero" when the feeler tip is retracted, say, 0.001 in. from the jig gauge surface in a direction away from the drum. A second type of dummy gauge shoe is then mounted in the drum to slide radially in contact with wall 50 of the spider 14. The dummy shoe has a gauge surface simulating that of the tip of set screw 38 in an actual shoe, and another gauge surface simulating that of the tip of the head, these two surfaces being spaced apart for the dimension d+0.001 in., and the eccentric 34 is rotated until the dummy shoe causes the comparator gauge to register "zero"; the set screw 39 is then tightened, urging the brass slug 40 into a slightly deformed locking engagement with pin 34.

It will be noted that the shoes 23, 23a in FIG. 1 each engage the wedge element 26 through a pair of small bearing spheres 42. Because the drum and shoe assemblies are made throughout of aluminum for the sake of reducing the rotational mass of the assembly, and because aluminum although quite strong, is relatively soft and easily surface-damaged, it is preferred to use the bearing spheres 42, which are of chrome steel, to define the actual gauge surfaces at the side of the shoe. The spheres 42 are easily press-fitted into previously bored holes (not illustrated) in the shoe side and, as will be seen, wide and relatively uncontrolled tolerance can be allowed in the relative parallelism of the tangent plane to the spheres and the plane of the shoe side. As for the mating gauge surfaces of the wedge element 26, they are supplied by means of tungsten carbide dowel inserts 43, which are cemented into conforming holes in the wedge element, and then ground off to form a common flat surface with the side of the wedge element, against which the spheres 42 may bear.

Of course, it will be understood that the other gauge-surface-bearing elements, such as the pin 34 and screw 38 are also of harder material than aluminum.

Now it is appropriate to suggest ways for the initial aligning of the wedge element with the central bisecting plane 31 thereof aligned through the center of curvature of drum surface 32, as mentioned previously in relation to step (5). Such aligning is easily accomplished beginning with the positioning of the dummy shoes on the actual drum, as under step (4). A central arbor element of the precision plate is used to position a conformingly pierced rotating gauge block in the form of an arm having a gauge surface that mates with the spheres 42 of the dummy shoe. With this block for controlling the angular alignment of the dummy shoe, the rotational sensors ("Alina") for controlling the angular positioning of the dummy shoe, and the radial positioning gauge block previously mentioned for controlling the radial position of the dummy shoe, it follows that the dummy shoes can be very precisely positioned on the actual drum, and that the actual wedge element 26 can then be accurately positioned on the actual drum and then permanently bolted in place with bolts 33. In practice, it has been found that positioning of the wedge element surfaces 43 to within about twenty micro-inches of desired position is easily achievable.

THE HEAD MOUNTING SHOES

It will be noted that the shoe 23 presents an upward facing leaf element 51 which constitutes the most proximal part of the mounting for head 22, but that the shoe 23a, is turned bottom-up, with its head 22a mounted at the end of a leaf element 51a which protrudes from beneath the body of the shoe. This arrangement permits the positioning of the two heads at different levels in the drum, so that upon traversing the tape (not shown) in clockwise rotation as shown by arrow 52 in FIG. 1, the head 22a first sweeps one track on the tape and head 22 then follows but sweeps an adjacent track across the tape. In use intended, the head 22 is a video signal playback (or "read") head, while the head 22a is a synchronizing signal playback head, the video signal tracks and the synchronizing signal tracks being differently positioned on the tape. Furthermore, in the use intended, there are three angularly equi-spaced pairs of heads on the drum, the not-shown second pair (clockwise from the pair 22, 22a) being respectively video signal record and sync signal record heads, and the third pair (counter clockwise from pair 22, 22a) being respectively sync signal erase and video signal erase, all of the video heads being angularly equi-spaced from one another and positioned in right-side-up shoes at the level of head 22 in the drum, and all of the sync heads being angularly equi-spaced from one another and positioned in inverted shoes at the level of heads 22a in the drum. All of this is no direct part of the present invention, but is presented by way of explanation, to show why and how the present invention makes use of but a single style of shoe and mounting system to adapt several different types of heads for use in the same head drum.

In fact, the heads are not only of diverse types in being video and sync heads, but the video heads themselves may be of different types. The video record and video erase heads are actually fixed heads, that is, fixed in permanent position in their respective shoes, just as are all three of the sync heads; but the video playback head 22 is shown here as of the displaceable leaf-mounted or automatic-scan-tracking type, which moves back and forth in an axial direction of the drum as the drum sweeps it in a circumferential direction across the tape; and the leaf 51 that is illustrated is of the bimorph S-bending type with sensing strip as disclosed in the previously mentioned copending application Ser. No. 722,822. As shown in FIGS. 1 and 2, the leaf 51 is mounted at the base end upon the shoe 23, between insulating members 53 and 54, and an insulating rack or circuit board 56 is superimposed upon a spacer member 57; upon the rack 56 are mounted electrical coupling jacks 58, which are electrically connected to the various electrode surfaces of the bimorph leaf through leads 59, 59a, 59b, and 59c and to the winding of head 22 through leads 59d and 59e. The leads 59f, 59g also shown are for the purpose of connecting the inboard upper main electrode with the outboard under electrode, and the outboard upper electrode with the inboard under electrode for producing an S-bend, as described more fully in the above mentioned application Ser. No. 722,822, now U.S. Pat. No. 4,099,211.

MOUNTING OF THE FIELD-REPLACEABLE MODULE

The shoe 23, with its head 22 and bimorphic leaf 51 is, when mounted, held in pressurized contact with the wedge element 26 as by means of a spring loaded pressure member 61 (FIGS. 1 and 3) in the form of a pin slidable in a conforming hole in a portion of spider 14 so as to engage the side of shoe 23 opposite the wedge element. A compression spring 62 urges the member 61 toward the shoe; the spring bearing against a flange 63 at the base of the pin portion of member 61. The spring 62 is held in a hod-like carrier 64 having a spring retaining bore 66 formed therein; although the bore 66 is open at the bottom, the spring is prevented from escaping by the adjacent surface 24 of base plate 12. The carrier 64 has an upwardly extending stud portion 67 fitting into a conforming bore 68 in the web of drum member 13, and a screw and washer assembly 69, threaded into the upper end of stud portion 67, retains the holder and spring. For retracting the pressure member 61, as for freeing the shoe 23 for removal, or when a new shoe is to be inserted, the pin portion of the member 61 has a transverse slot 71 formed in the upper portion, into which a suitable tool, such as an eccentric pin tool, may be inserted. The slot 71 is kept upright by a flattened lower side of flange 63 bearing on surface 24. A bore 72 is provided in member 14 for access of the eccentric tool, the bore 72 extending upwardly through member 13 as well, and serving also as a threaded bore for a retaining bolt 73 presently to be described.

VERTICAL POSITIONING AND CLAMPING OF THE SHOE

On the bottom surface of shoe 23 are formed four corner feet 74, the bottom surfaces of which are lapped to the same plane, and rest on the gauge surface 24 of base plate 12. The shoe is further provided with a pair of side shoulders 76 extending vertically higher than any other parts of the shoe, and across the shoulders 76 is placed a clamping block 77, which has a counter-sunk depression 78 in the center of the upper face. Across the clamping block 77 is laid a clamping bridge 79, bolted down at the ends to adjacent portions of drum 13 and wedge member 26 as by means of bolts 73 and 81, respectively, the bolt 73 being threaded into the upper extension of bore 72 as previously mentioned. A set screw 82 is threaded through the bridge 79 to engage and seat into the depression 78 of block 77. When set screw 82 is sufficiently tightened, it loads the members 77, 79 as leaf springs and clamps the shoe 23 firmly in position.

It was previously mentioned that shoe 23a if mounted in an upside-down relationship on gauge surface 24 of base plate 12. Furthermore, as will be further explained below, the leaf member 51a is not a displaceable bimorph leaf as is the leaf 51 of shoe 23. Consequently there is no need to bridge the shoe for clamping it to the base plate; instead a single bolt and washer combination 83 is used, the bolt 83 passing through enlarged bores 84 and 86 (FIG. 8) in the shoe 23a and the leaf member 51a, respectively, which permit lateral adjustment of the shoe position prior to clamping down with the bolt 83.

ALTERNATIVE SHOE STRUCTURES

Figure 5:
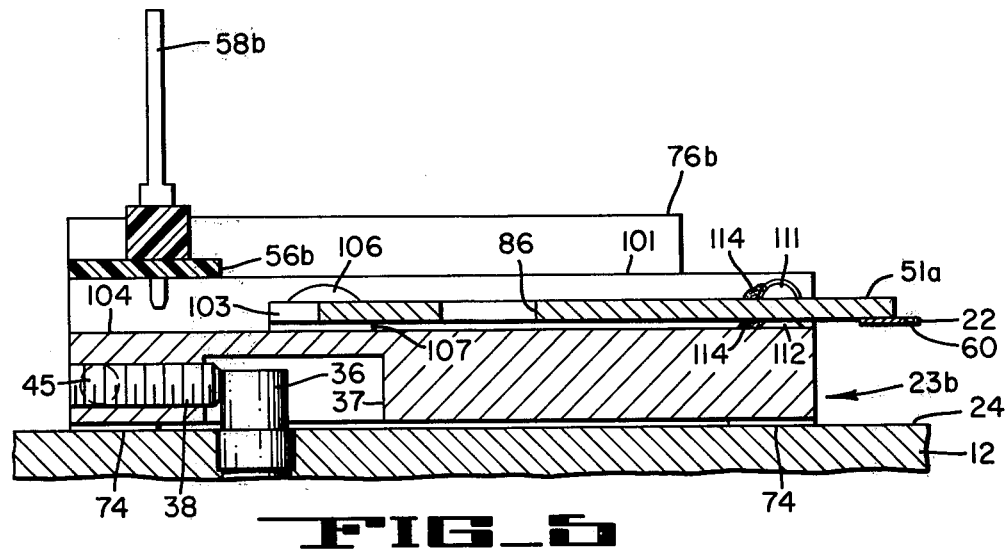
FIG. 5 is a cross-sectional elevation view of the assembly of FIG. 4, taken on the plane 5—5 of FIG. 4.
Figure 6:
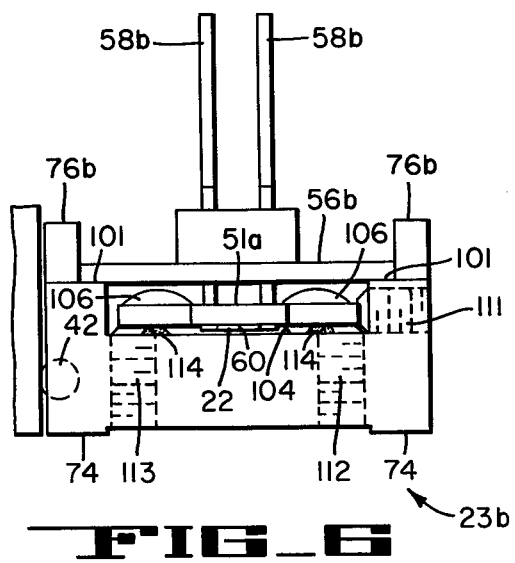
FIG. 6 is a right-end view of the assembly of FIG. 4.

For the video record and video erase heads previously referred to, no bimorph head mounting is needed, and the mounting shoe is of somewhat different construction inwardly, so to speak, while being externally identical with shoe 23 for interchangeability, as shown in FIGS. 4–6 for the video record and erase type shoe 23b.

Shoe 23b is identical with shoe 23 in having the same type of head 22, recess 37, precision set screw 38, locking set screw 41, bearing spheres 42, and lower corner feet 74. The side shoulders 76b are of the same height as shoulders 76. Thus the shoe 23b module fits in precisely the same way into the head drum positioning environment. However, the shoulders 76b have interior stepped portions 101 for supporting a smaller rack or circuit board 56b as required for the single pair of terminal jacks 58b needed for the head 22. A major difference lies in the structure and mounting of the (aluminum) leaf 51a, which has a necked-down portion 102 adjacent its base 103. In manufacturing assembly the base 103 is fastened to the floor portion 104 of the shoe as by bolts 106 and a spacer 107. The assembly is then placed in a suitable jig and the head is observed with a microscope while the set screw 38 is adjusted to bring the head to a desired spacing from the tip of screw 38, and then set screw 41 is tightened to lock 38. A brass slug 45 may be used between the screws 41 and 38. The leaf 51a is then bent by hand in a counter-clockwise direction (as seen in FIG. 4) to bring the free end portion of the leaf 51a into contact with the right side wall, and the leaf is also bent downwardly to bring the free end portion into contact with the floor 104. This bending is sufficient to overcome the elastic limit of the aluminum and the leaf remains in the bent position. The shoe is then mounted in a gauge assembly of any suitable type, and the leaf is carefully bent in return directions by means of three set screws 111, 112 and 113 until microscopic examination indicates that the head 22 is in its predetermined precise position both vertically and horizontally. Dabs of epoxy glue 114 are then placed so as to permanently seal the leaf in the adjusted position, one dab being placed between leaf and shoe at each of the adjusting set screw 111—113 positions.

As for the upside-down sync head mounting shoes 23a, shown in FIGS. 7–9, the procedure is similar, the leaf 51a being first bent toward set screws 111a, 112a and 113a, then returned by the screws to desired gauge position, and cemented with epoxy glue dabs 114. It will be noted that shoe 23a also has a recess 37a, gauge set screw 38a, locking set screw 41a, bearing spheres 42a, corner feet 74a, lower side shoulders 76a, circuit board rack 56b, terminal 58a, but the same aluminum leaf 51a is used in both shoes 22a and 22b.

A slightly different procedure is used to calibrate the shoe 23 after setting the bimorph mounted head 22 in its shoe 23, and after the set screws 38 and 41 have been adjusted and locked. The bimorph leaf 51 cannot be bent about as can be the leaves 51a; instead the surfaces defined by the feet 74 and spheres 42 of the shoe must be altered until they are in the correct dimensional relation to the head 22. Accordingly, the feet 74 of the shoe, which were initially manufactured to be somewhat oversize in the vertical dimension, are milled or lapped to bring them into a plane that is observable by microscopic examination to be precisely normal to the plane of the head gap 60 and spaced vertically from the head for the desired dimension. Then the spheres 42 are pressed into their recesses in the side of the shoe and are brought to within about 300 micro-inches from (and short of) the desired position with respect to the plane of the head gap 60. Micrometric clamps can be used for this purpose, together with microscope examination. The remaining 300 micro-inches are then removed from the outwardly-facing sides of the spheres 42 themselves, as by hand-lapping. A final dimensional tolerance of plus-or-minus fifty micro-inches is easy to achieve.

Thus, there has been described a rotating transducing head drum that mounts a number of transducer heads for sweeping rotation across the surface of a record medium. The head mounts are either of the bimorph, i.e., laterally displaceable leaf type, or of a non-displaceable leaf type simulating the displaceable type; in either case the mounts are factory secured in substantially identical shoes and in precise predetermined dimensional relation to radially, axially and circumferentially facing gauge surfaces of the shoes. Mating gauge surfaces are factory formed on the drum. Thus, the heads with their shoes are interchangeable in the field without the need for field adjustments.

What is claimed is:

1. A magnetic recording-reproducing machine of the type including means for positioning a magnetic recording medium in a predetermined position on said machine, and at least the magnetic transducing heads positioned on said machine in a desired transducing relation with said recording medium in said predetermined position thereof, characterized in that:

each of said transducing heads is mounted in a shoe member having at least three first bearing portions facing in different directions and having a first predetermined dimensional relationship with one another and with said head;

said machine is provided with at least three second bearing portions for each shoe member respectively engaging said first bearing portions of the corresponding shoe member in a predetermined mating relationship further defined as comprising a second predetermined dimensional relationship of said second bearing portions with one another and with said recording medium positioning means, for thereby positioning said corresponding shoe with said head thereof in said desired transducing relation with said recording medium;

means are provided for holding said corresponding shoe member on said machine with said first and second bearing portions in said predetermined mating relationship;

said positioning means includes a cylindrical guide having a peripheral tape guiding surface and guide means for guiding said magnetic recording medium in the form of a tape in a helical path around said cylindrical guide, and said heads and the respective shoes therefor are mounted on a rotating drum carrying said first bearing portions, further characterized in that the first bearing portions for each shoe have a predetermined angular relation with the first bearing portions for the other shoes;

each shoe has a recess formed in said bottom side thereof with one of said first bearing portions being located on the wall of said recess that lies radially closest to the drum axis;

said drum is provided with an eccentric adjustment pin, constituting one of said second bearing portions, for each of said shoes; and said adjustment pin being mounted with the eccentric portion thereof projecting upwardly into said recess of the respective shoe and engaging said first bearing portion of said recess;

whereby the radial position of said shoe may be established during the assembly rather than during the production stage of drum manufacture.

2. A machine as described in claim 1, and further characterized in that a wedge element is provided on said drum between and adjacent to a pair of said shoes to define said angular relationship, the two inclined faces of said wedge element each constituting one of the second bearing portions for the respective adjacent shoe.

3. A machine as described in claim 2, further characterized in that each wedge element is adjustable with respect to said drum for attaining said second predetermined dimensional relationship with respect to the peripheral surface of said drum during assembly of said machine rather than during the production of said drum.

4. A machine as described in claim 2, and further characterized in that each of said pair of shoes has a pair of hardened spherical bearing elements fitted into conforming recesses in the side of said shoe facing the adjacent wedge element and constituting first bearing portions of the respective shoe.

5. A machine as described in claim 1, further characterized in that said drum has at least one planar gauge surface normal to the drum axis and constituting second bearing portions; and each shoe has a bottom side formed with at least one gauge face constituting the mating first bearing portion for said planar drum surface.

6. A machine as described in claim 1, further characterized in that:
   said first bearing portion in said recess is constituted by a first set screw element threaded through the radially inwardmost side of said shoe and emerging in said recess, with the tip of said set screw element defining the respective first bearing portion; and
   a second locking set screw element is threaded through said shoe to engage a side of said first set screw element to lock the latter in its adjusted position.

7. A machine as described in claim 6, further characterized in that a clamp means is provided to engage and hold each of said shoes in position on said drum, said clamp means being releaseable for field interchange of said shoes.

8. A machine as described in claim 6, further characterized in that each of said heads is mounted directly on the free end of a cantilever leaf element, the base of the leaf being affixed to the respective shoe and said first set screw element being adjusted to establish said first predetermined dimensional relationship as between said first set screw and said head.

9. A machine as described in claim 8, further characterized in that third set screw means are threaded on each shoe for engaging said leaf near the free end thereof for bending said leaf to establish said first predetermined dimensional relationship as between said head and said hardened spherical bearing element.

10. A machine as described in claim 9, further characterized in that fourth set screw means are threaded on each shoe for engaging said leaf near the free end thereof for bending said leaf to establish said first predetermined dimensional relationship as between said head and said bottom side gauge face of the shoe.

* * * * *